United States Patent
Bouse et al.

(10) Patent No.: US 8,174,402 B2
(45) Date of Patent: May 8, 2012

(54) MACHINE CONDITION INDICATION SYSTEM

(75) Inventors: Kai Bouse, Tellico Plains, TN (US); Stewart V. Bowers, III, Knoxville, TN (US); Jim Robinson, Knoxville, TN (US); Richard Piety, Knoxville, TN (US); Todd Reeves, Knoxville, TN (US)

(73) Assignee: CSI Technology, Inc., Wilmington, DE (US)

( * ) Notice: Subject to any disclaimer, the term of this patent is extended or adjusted under 35 U.S.C. 154(b) by 1131 days.

(21) Appl. No.: 12/013,166

(22) Filed: Jan. 11, 2008

(65) Prior Publication Data
US 2008/0106424 A1    May 8, 2008

Related U.S. Application Data

(63) Continuation of application No. 11/047,268, filed on Jan. 31, 2005, now abandoned.

(51) Int. Cl.
*G08B 21/00* (2006.01)
*G06F 11/30* (2006.01)

(52) U.S. Cl. ........ 340/679; 340/635; 340/648; 702/182; 702/183; 702/184; 702/185

(58) Field of Classification Search .................. 340/635, 340/648; 702/182–186
See application file for complete search history.

(56) References Cited

U.S. PATENT DOCUMENTS

| | | | |
|---|---|---|---|
| 3,662,368 A | 5/1972 | Farnsworth et al. | |
| 4,525,763 A | 6/1985 | Hardy et al. | |
| 5,241,482 A * | 8/1993 | Iida et al. | 700/110 |
| 5,309,351 A | 5/1994 | McCain et al. | |
| 5,481,481 A | 1/1996 | Frey et al. | |
| 5,525,673 A | 6/1996 | Nakahata et al. | |
| 5,637,241 A | 6/1997 | Moates | |
| 5,710,723 A | 1/1998 | Hoth et al. | |
| 5,726,911 A | 3/1998 | Canada et al. | |
| 5,852,351 A | 12/1998 | Canada et al. | |
| 5,854,994 A | 12/1998 | Canada et al. | |
| 5,859,596 A | 1/1999 | McRae | |
| 5,875,420 A * | 2/1999 | Piety et al. | 702/182 |
| 5,907,491 A | 5/1999 | Canada et al. | |
| 6,078,874 A | 6/2000 | Piety et al. | |
| 6,199,018 B1 | 3/2001 | Quist et al. | |
| 6,297,742 B1 * | 10/2001 | Canada et al. | 340/635 |
| 6,298,308 B1 | 10/2001 | Reid et al. | |

(Continued)

OTHER PUBLICATIONS

IFM Efector, Innovation in Predictive Maintenance, Apr. 8, 2005.

(Continued)

*Primary Examiner* — Julie Lieu
(74) *Attorney, Agent, or Firm* — Luedeka Neely Group, P.C.

(57) ABSTRACT

A machine condition monitor resides in close proximity to a machine train, such as an AC inductive electric motor coupled to a driven unit such as a centrifugal pump or fan. A plurality of sensing devices are connected to the machine and the machine condition monitor. Machine state and condition parameters sensed by these devices are utilized by the machine condition monitor to derive machine condition values for each component and for the machine train as a whole. These derived condition values are transmitted via an industrial communications network to a control center where they can be trended and monitored. With no particular knowledge of machine analysis techniques or severity of specific machine faults, and no special training, Operators and Production Planners can use the condition values to plan production schedules, adjust process parameters, and request appropriate maintenance action.

19 Claims, 4 Drawing Sheets

U.S. PATENT DOCUMENTS

| | | |
|---|---|---|
| 6,437,692 B1 | 8/2002 | Petite et al. |
| 6,442,511 B1 * | 8/2002 | Sarangapani et al. ........ 702/194 |
| 6,477,485 B1 * | 11/2002 | Radulovic et al. ............ 702/187 |
| 6,484,109 B1 | 11/2002 | Lofall |
| 6,489,884 B1 | 12/2002 | Lamberson et al. |
| 6,556,956 B1 | 4/2003 | Hunt |
| 6,646,564 B1 | 11/2003 | Azieres et al. |
| 6,662,118 B2 | 12/2003 | Carle et al. |
| 6,704,660 B2 | 3/2004 | Morrow et al. |
| 6,704,668 B2 | 3/2004 | Bibelhausen et al. |
| 6,915,235 B2 * | 7/2005 | Reeves et al. ................. 702/182 |
| 6,985,084 B2 | 1/2006 | Sobel et al. |
| 7,039,557 B2 | 5/2006 | Mayer et al. |
| 7,133,801 B2 | 11/2006 | Song |
| 7,142,990 B2 | 11/2006 | Bouse et al. |
| 7,218,974 B2 | 5/2007 | Rumi et al. |
| 2003/0158703 A1 * | 8/2003 | Lumme et al. ................. 702/182 |
| 2003/0212529 A1 | 11/2003 | Bibelhausen et al. |
| 2005/0062599 A1 * | 3/2005 | Neubauer et al. ............. 340/506 |

OTHER PUBLICATIONS

Daming Lin et al., CBM Decision Making with Expert Systems, As early as Jun. 22, 2005, 1-12, www.omdec.com.

Joe Van Dyke, Using an Expert System for Precision Machine Tool Diagnostics: A Case Study, 1998, DLI Engineering, www.DLI-engineering.com.

* cited by examiner

MACHINE CONDITION INDICATION SYSTEM

This application claims priority as a continuation application to U.S. patent application Ser. No. 11/047,268 filed Jan. 31, 2005 now abandoned titled "Machine Condition Indication System," the entire contents of which are incorporated herein by reference.

FIELD OF THE INVENTION

The present invention relates generally to systems and methods for categorizing the expected dependability (i.e., productive capability) of a machine asset. More particularly, the invention relates to a "Condition Transducer"—a sensing device for producing a value that is an analog of machinery condition in the same way a thermocouple produces a value that is an analog of temperature.

BACKGROUND OF THE INVENTION

Process operators, production planners, and maintenance personnel in industrial process environments must routinely make decisions about the utilization of their production assets. They want to know the productive capability of assets needed for successful completion of scheduled output. Operators and production managers routinely adjust the operational parameters of the available assets to tune their processes for greater efficiency, to maximize production output, or to safeguard a weakened asset in an attempt to finish a batch or production run before a machine breaks down.

Traditionally such persons rely on the loose integration of independent systems, input from their maintenance departments, or the advice of expert machine analysts. To keep abreast of machine conditions various approaches are utilized, such as periodic walk-around vibration programs or online continuous monitoring systems. Most of these systems focus on collecting data that is typically transported to a central location for offline analysis by an expert.

These systems are seldom well understood by the operators and production planners. They are in the domain of the maintenance or machine reliability departments and require significant training and expertise. Timely feedback which could be used to adjust the production process is rarely available. A few of the online offerings attempt to provide some local annunciation mechanism based on limits applied to measured values, but these typically comprise merely a relay closure to light a lamp or sound an alert. This type of indication is of little use to an operator in the control room.

Many systems rely on simple thresholds, ratios to baselines and statistics to trigger alarms or indicate machine condition. Some systems rely on remote host processors or other secondary systems running software expert systems to diagnose specific machine faults, but these techniques are typically hampered by the limited availability of data and their remote location.

Some prior systems, such as the Distributed Diagnostic System described in U.S. Pat. No. 6,199,018, have attempted to simplify reporting of condition information with green, yellow, and red indicators. Unfortunately, this does not give the operators or planners a real sense of the productive capability or stability of a machine. For example, if a machine was operating in the green condition and goes yellow, was it running in the green just below the yellow threshold and now has changed only slightly to run yellow, or has it moved from far down in the green to very high in the yellow (i.e., almost red)? If one must choose between whether to keep an asset active in production or alter the process, a machine analyst (if available) would be required to help make the decision.

In general, the output of all these systems is discrete, which is a simple indication that further investigation is required. The only analog data provided, if any, are the actual measured raw values. All of these approaches still require a machine fault expert who is familiar with the criticality of specific parameters or even the seriousness of specific faults to make judgment calls.

What is needed, therefore, is a machine condition indication system that produces advisory health information in a format that an untrained and relatively inexperienced person can successfully use to make operational or productive capacity judgments relative to their available production assets. Also needed is a system that provides advisory health information in such a manner that it is amenable for use by automated agents responsible for tuning a particular control system. Such capabilities would encourage awareness of the impact a process has on the production assets and enable production installations to manage these assets in an informed manner, rather than running strictly by-the-book or simply guessing.

SUMMARY

The above and other needs are met by a field-installable machine condition indication device which reports information regarding the operational condition of the machine to a central monitoring system. The indication device includes sensors mounted at several locations on the machine for sensing operating characteristics and for producing sensor signals indicative of the operating characteristics. A processor in the indication device receives the sensor signals and acquires data related to the operating characteristics. The processor processes the data to calculate several characteristic parameters indicative of the operational condition of the machine. The processor operates on the characteristic parameters to derive a single condition value which is indicative of the operational condition of the machine. The indication device includes a communication interface for communicating the condition value via a communication link to the central monitoring system.

In a most preferred embodiment, the processor of the machine condition indication device operates on the characteristic parameters to derive the single condition value as an analog value between 0.0 and 1.0, where 0.0 indicates a failed condition and 1.0 indicates a proper operating condition.

In another aspect, the invention provides a method for reporting an operational condition of a machine to a central monitoring system. The preferred method includes attaching vibration sensors at several locations on the machine for sensing vibrational characteristics, and producing vibration sensor signals that are indicative of the vibrational characteristics. The preferred method also includes attaching temperature sensors for sensing thermal characteristics, and producing temperature sensor signals that are indicative of the thermal characteristics. The method further includes acquiring data from the vibration sensor signals related to the vibrational characteristics, acquiring data from the temperature sensor signals related to the thermal characteristics, and processing the data to calculate several characteristic parameters indicative of the operational condition of the machine. Based on the characteristic parameters, a single condition value is derived which is indicative of the operational condition of the machine, and the condition value is communicated to the central monitoring system.

In one preferred embodiment, the method also includes attaching a flux sensor for sensing flux characteristics, and producing flux sensor signals which are indicative of the flux characteristics. This preferred method also includes attaching a speed sensing device such as an optical or magnetic tachometer for sensing rotational speed, and producing a speed sensor signal indicative of the rotational speed of the machine. The method includes acquiring data from the flux sensor signal and the speed sensor signal, and processing the data to calculate several characteristic parameters of the electrical condition of the machine driving component and the on or off state of the machine. The method also includes utilizing the measured rotational speed to adapt the process of determination of machine condition from the sensed characteristics according to the rotational speed of the machine.

The machine condition indication device and method described herein address the shortcomings of the limited prior approaches as follows. The system outputs machine condition assessments as analog values, such as from 0.0-1.0, which may be logically interpreted as 0 to 100% operational. The system provides fault-classification alerts which identify the most likely source of any detected degradation and a recommended course of preventive and/or corrective action. The condition indication system communicates the machine condition values and fault-classification alerts over standard fieldbus wiring as an integrated part of the control network. Using inherent capabilities of a typical process control system, the condition values may be trended for rate of change, monitored for correlated changes when production parameters are altered, compared for variation between machine operators, and be applied against alarm thresholds. But most importantly, relatively inexperienced and less trained individuals can reasonably interpret the significance of the condition values and fault-classification alerts and respond appropriately.

The machine condition indication system holistically combines information from all measurements and from all components of the machine train. This evaluation occurs locally and autonomously in a device installed near the monitored machinery. A change in a single condition parameter that would typically cause other systems to generate an alarm is assessed by the system for relevance in light of all other known information with the potential of modifying its impact on the condition value or perhaps affecting the severity of an alert. In addition to the magnitude of a change, the types of any detected machine faults also have a varying impact on the machine condition and fault severity output. Obviously, not all conditions have the same potential impact, require the same immediacy of attention, or influence the operation of the machine in the same manner. Logically, combinations of faults and severity of changes in machine conditions must also be factored differently.

Unlike many machine monitoring systems which utilize a static baseline for applying alarm criteria, the present invention uses an adaptive "smart" baseline signature vector of measured characteristics. It continually evaluates the baseline to judge whether it is truly representative of the "normal" state of the asset being monitored and whether the baseline vector components should be adjusted up or down to a new set of values. Unlike systems that rely solely on fixed or statistically derived thresholds to trigger alarms, this invention heuristically combines a multiplicity of factors to determine the degree of degradation, rate of degradation and a relative condition severity.

It is envisioned that the analog machine condition information provided by the invention will be fully integrated into the process environment in the same manner as any other standard sensing device, such as temperature or pressure transducers. Although operators have long had visibility into the production process itself, this invention seamlessly merges advisory information about the underlying process machinery into that window of visibility.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
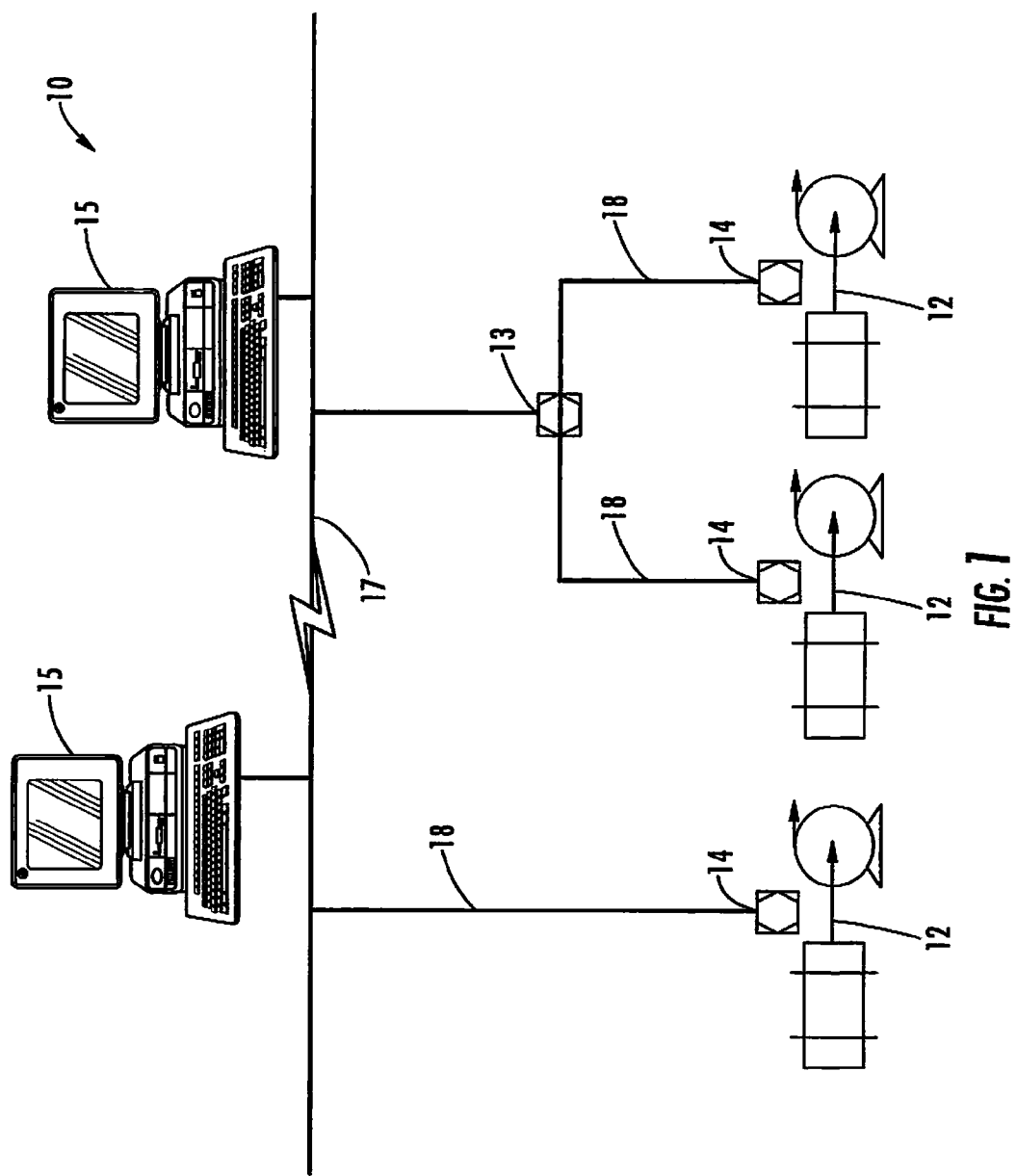
FIG. 1 depicts a functional block diagram of a network of machine condition monitoring devices according to a preferred embodiment of the invention.

FIG. 1 depicts an exemplary machine condition monitoring system 10 constructed in accordance with certain aspects of the present invention is illustrated. In general, the exemplary machine condition monitoring system 10 is coupled to one or more machines 12. The system 10 comprises one or more condition reporting devices 14 coupled to a corresponding one of the machines 12. In the exemplary system of FIG. 1, each of the machines 12 is represented as a conventional AC induction motor directly coupled to a centrifugal pump, although the present invention is applicable to other machines such as fans, compressors, brushless DC machines, switched reluctance machines, and the like.

Each of the condition reporting devices 14 collects information concerning the operational status of the machine 12 with which it is associated. For example, each condition reporting device 14 may collect information concerning the vibrational characteristics of the machine 12, the temperature of the stator, windings and/or bearings of the machine 12, the flux established in the stator and rotor, and the rotational speed of the machine 12. This information may be stored in data storage elements within the condition reporting devices 14.

In the preferred embodiment, the collected information concerning each of the various machines 12 is processed by an associated condition reporting device 14 to produce a status indication reflecting the operational status of the associated machine 12. Preferably, this status indication takes the form of a numerical condition indicator of between 0.0 and 1.0 that is reported to one or more computers 15 via a communication network 17. If the machine 12 is operating properly, a number near 1.0 will be reported. If the machine 12 appears to be operational but in a partially degraded state of possible interest to the operator or requiring maintenance soon, a number around 0.5 will be reported. If the machine 12 is in a seriously degraded state or has failed, a number near 0.0 will be reported. The condition reporting devices 14 may also pre-process some or all of the collected information for external communication to, and later processing by, other computers in the system 10.

In some embodiments, communication between the devices 14 and the computers 15 is enabled by protocol translators 13, such as depicted in FIG. 1.

In one embodiment, each of the condition reporting devices 14 includes a microcontroller or microprocessor that runs software establishing a local, diagnostic model. The diagnostic model receives the collected information and, using the local model, indicates the condition of the machine. In this embodiment, the parameters that define the local model may be downloaded to the condition reporting devices 14, such as from the computers 15 in the system 10.

Figure 2:
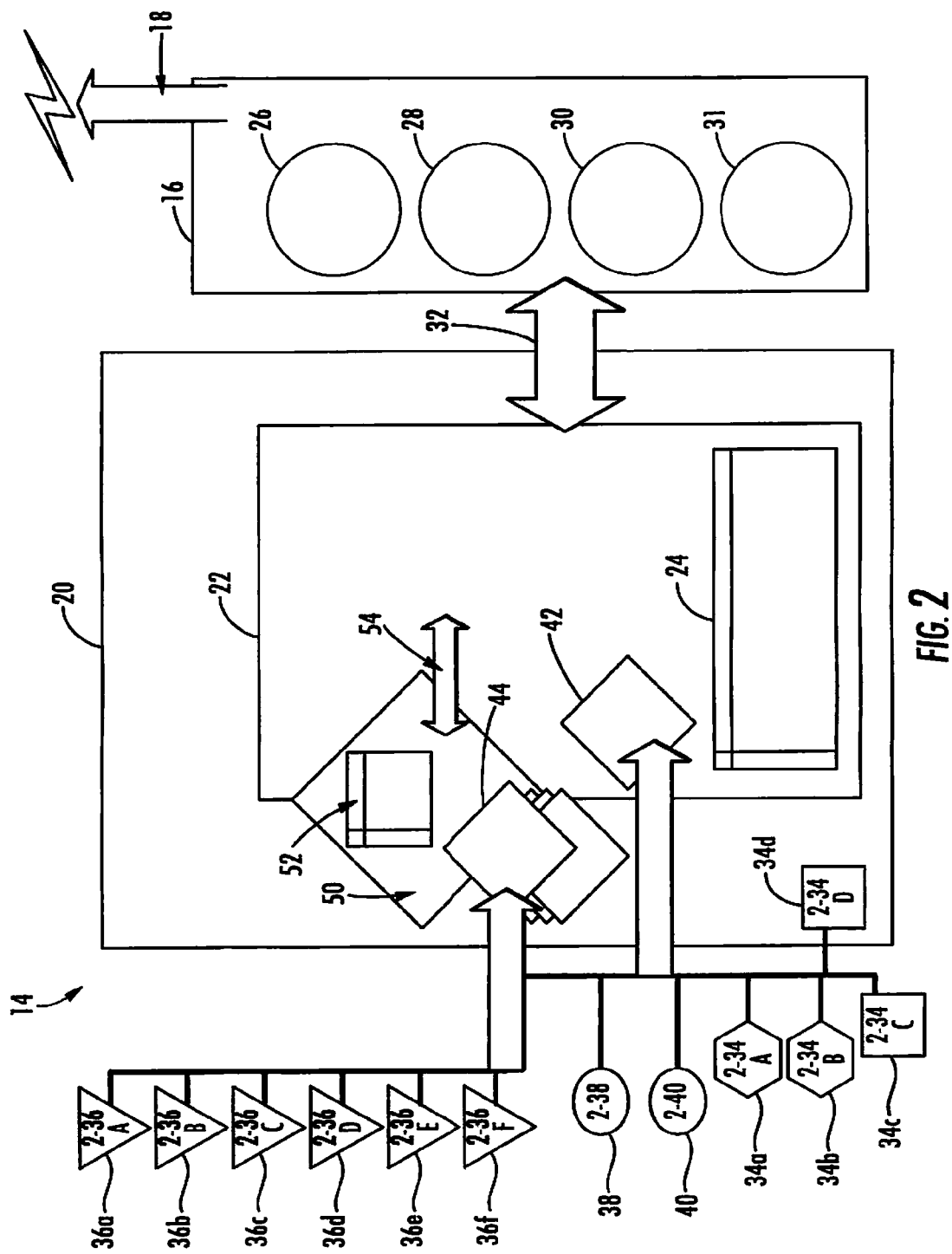
FIG. 2 depicts a functional block diagram of a machine condition monitoring device according to a preferred embodiment of the invention.

As shown in the example of FIG. 2, each condition reporting device 14 includes a communications board 16 that is adapted to communicate (i.e., transmit and receive) information and data over an appropriate communications link 18. In the preferred embodiment, the communications board 16 includes appropriate hardware, software and/or firmware to allow the communications board 16 to receive and transmit information on the link 18 according to one or more appropriate protocols. For example, the communications board 16 may be adapted to communicate using wireless communication techniques, or using standard communication protocols such as the HART™, CT Net™, Modbus+™, Profibus™ protocols, FOUNDATION™ fieldbus or other similar protocols. The communications board 16 may be constructed and configured using known devices and techniques, and the appropriate construction of such a board will be apparent to those of ordinary skill in the art having the benefit of this disclosure.

Coupled to the communications board 16 is a main control board 20 that, in the exemplary embodiment of FIG. 2, includes a microprocessor or microcontroller 22 and a data storage device 24. In one embodiment, the microprocessor 22 is a Motorola MC68LC302, HC11 or HC05 type processor and the data storage device 24 comprises flash memory, such as a flash memory device contained within the microprocessor 22 or an external flash memory device. Other memory devices, such as EPROM and DRAM devices may be used in conjunction with the microprocessor 22 to implement the system described herein. The construction of the main control board 20 and the selection of the appropriate memory devices will be apparent to one of ordinary skill in the art having the benefit of this disclosure.

In a preferred embodiment, a modem device 26, such as an RS-485 modem, is also coupled to the microprocessor 22 such that the microprocessor can communicate over the modem device 26. In the exemplary embodiment of FIG. 2, additional communication devices are provided to allow the microprocessor 22 to communicate data and information. Specifically, an RF transceiver 28 is provided to allow for "wireless" communications and a HART™ ASIC 30 or other appropriate device (e.g., a FR 3244 transmitter) is provided to allow for the microprocessor 22 to communicate using the HART™ protocol. Those of ordinary skill in the art will appreciate that the communication devices 26, 28 and 30 are only examples of the types of communication devices that may be used with microprocessor 22 and that other devices (and other combinations of devices) may be used. Embodiments are also envisioned wherein communication devices such as devices 26, 28 and 30, are eliminated and all microprocessor communications are accomplished through a CT protocol board 31.

In certain embodiments, a dual-port memory device 32 (e.g., a dual port RAM) may be positioned between the microprocessor 22 and the various devices used by the microprocessor for communications. FIG. 2 illustrates the use of such a device 32 in the communications link between the microprocessor 22 and the communications board 16. In other embodiments the connection between the microprocessor 22 and communications board 16 may be accomplished using DMA mechanisms, serial data interface, parallel data interface or any other typical method which would be apparent to those of ordinary skill in the art.

As depicted in FIG. 2, the microprocessor 22 is adapted to receive information provided from a sensor set adapted to sense various operating parameters related to the condition of the machine 12. FIG. 2 illustrates one such exemplary sensor set including twelve sensors: 34a-34d, 36a-36f, 38 and 40.

Sensors 34a-34d are preferably RTD transducers that are positioned appropriately with respect to the machine 12. In one embodiment, two of the RTD transducers 34a-34d are positioned near two bearing devices within a machine 12 and other of the RTD transducers are positioned to detect the temperature of the windings of machine 12, the temperature of the machine housing, and/or the temperature of the environment in which machine 12 is operating. The precise placement and use of such RTD temperature and vibration sensors will vary from application to application, and those of ordinary skill in the art will appreciate that fewer or more than four RTD transducers may be used to implement the teachings contained herein. Also, those of ordinary skill in the art will appreciate that temperature detection devices other than RTD transducers may be used to detect and provide information concerning the temperature of machine 12, its bearings, housing and/or environment.

In the embodiment of FIG. 2, the microprocessor 22 includes a plurality of built-in A/D converters 42 coupled to the RTD transducers 34a-34d. Each of the RTD transducers 34a-34d preferably comprises an RTD device with an amplifier that receives and conditions the output signal of the RTD device such that it is a signal within the range acceptable for the appropriate A/D converter 42 of the microprocessor 22. In embodiments where a microprocessor 22 not having built-in A/D capabilities is utilized, one or more separate A/D converters, and possibly separate communications devices, may be coupled between the RTD transducers 34a-34d and the microprocessor 22.

In addition to the RTD transducers 34a-34d, the microprocessor 22 preferably also receives output signals from vibration sensors 36a-36f that, in the embodiment of FIG. 2, include vibration detectors coupled to amplifiers for proper conditioning of the vibration signals in a manner similar to the conditioning associated with the RTD transducers discussed above. The vibration sensors 36a-36f may be positioned with respect to the machine 12 to detect mechanical vibrations (or the absence of such vibrations) from the machine 12 that are induced when the machine 12 is running and/or at rest.

In the embodiment of FIG. 2, the microprocessor 22 also receives the output signals from an electromagnetic flux sensor 38 that includes a flux sensing device and a conditioning amplifier. In general, the flux sensor 38 should be positioned appropriately with respect to the associated machine 12 to detect the magnitude of the flux existing in the stator of machine 12. As those skilled in the art will appreciate, the flux sensor 38 allows for a determination of the rotor speed, the load of the machine 12, and the conditions of the rotor bar and stator windings, among other things.

As shown in FIG. 2, the microprocessor 22 also preferably receives output signals from a speed indicating sensor 40, such as an optical tachometer, that produces a signal representative of the rotational speed of the machine 12.

In the preferred embodiment of the invention depicted in FIG. 2, the signals produced by vibration sensors 36a-36f, the flux sensor 38, and the speed sensor 40 may be acquired in parallel by the use of multiple A/D converters 44. As depicted in FIG. 2, these additional A/D converters 44 may be coupled to the microprocessor 22 by a digital signal processor (DSP) 50. The embodiment of FIG. 2 also includes an internal memory 52 controlled by the DSP 50 for buffering the collection of signal data from the sensors. The synchronously collected data may then be transferred to the microprocessor 22 via a communications link 54. Preferably this link is a DMA transfer, but those of ordinary skill in the art will interest can give an indication of present or developing problems relating to bearing fatigue and failure, cavitation/turbulent flow, improper lubrication, imbalance, misalignment, and mounting soft-foot, as well as basic motor problems associated with slot pass frequencies. Some basic motor problems can also be indicated by excessive heating observed from temperature readings. To provide an indication of such motor problems, the machine condition monitor implements, among other things, the analysis techniques listed in Table I.

TABLE I

| Machinery Condition Monitoring Environment | |
|---|---|
| Raw data collection | The system uses high sample rate, long acquisition time, and multi-channel time synchronous operation. |
| Characteristic Calculations | The system uses arbitrarily complex relationships, optimized domain-specific intrinsics, a full range of arithmetic capabilities, and downloadable extendable calculation sets. |
| Time Waveform Techniques | The system applies mean, minimum, maximum, span (peak-to-peak), absolute peak, variance, skewness, kurtosis, RMS (standard deviation), crest factor, autocorrelation, and time synchronous waveform techniques. |
| Frequency Techniques (including order-based) | The system applies discrete Fourier transform (SF, FFT), peak, phase, power, energy bands, synchronous (harmonic families) and non-synchronous (inharmonic) energy (even, odd, both, range), sidebands (upper, lower, both, even, odd, both) frequency techniques. |
| Additional Analytical Methods | The system uses windowing, averaging, interpolation and decimation, dynamic filters (FIR, IIR), convolution, peak group signatures, energy distributions, extreme low-frequency, digital integration and differentiation, cross-channel (wobble and eccentricity), joint time-frequency, cepstrum, wavelets, demodulation, and PeakVue ® analytical methods. |
| Historical Data Management | The system applies historical data management, including multilevel temporal statistical characterization (minimum, maximum, mean, median, moments, Z), correlation, regression, trend fitting, statistical means analysis, and querying for short/long-term characterization of a value according to hour/shift of day, day of week, week of month/year, month/quarter of year. |
| Inference Environment | The system inference environment uses finite state automata, directed graph, hybrid cognitive mesh (from fuzzy cognitive map & neural net techniques), dynamic fuzzy surface (runtime sets adaptive to data in several dimensions), calculated atoms (characteristic expression results), activation axons (active transition links between nodes), proposition nodes, rich calculation environment to support dynamic heuristics (GA-capable - new propositions can be programmatically composed dynamically and executed at runtime), and downloadable extendable inference sets; approximately equivalent to calculating a multi-dimensional vector whose magnitude represents severity/urgency and whose "direction cosines" identify the possible condition most similar to the current "signature." | appreciate that many other standard techniques exist for moving blocks of data between processors.

The simultaneous collection of signal data from the sensors 36a-36f, 38, and 40 simplifies the subsequent analysis as will be appreciated by one skilled in the art of machine condition analysis. It will also be apparent that data could also be collected from the sensors sequentially.

The selection, construction, and positioning of sensors 34a-34d, 36a-36f, 38, and 40, and the coupling of such sensors to microprocessor 22, will be apparent to those of ordinary skill in the art having the benefit of this disclosure. Sensors other than those discussed above may be used without departing from the teachings herein. For example, other sensor types (e.g., current and/or voltage sensors) may be added or substituted as required for reliability or cost optimization or to better acquire various desired operational characteristics.

Figure 3:
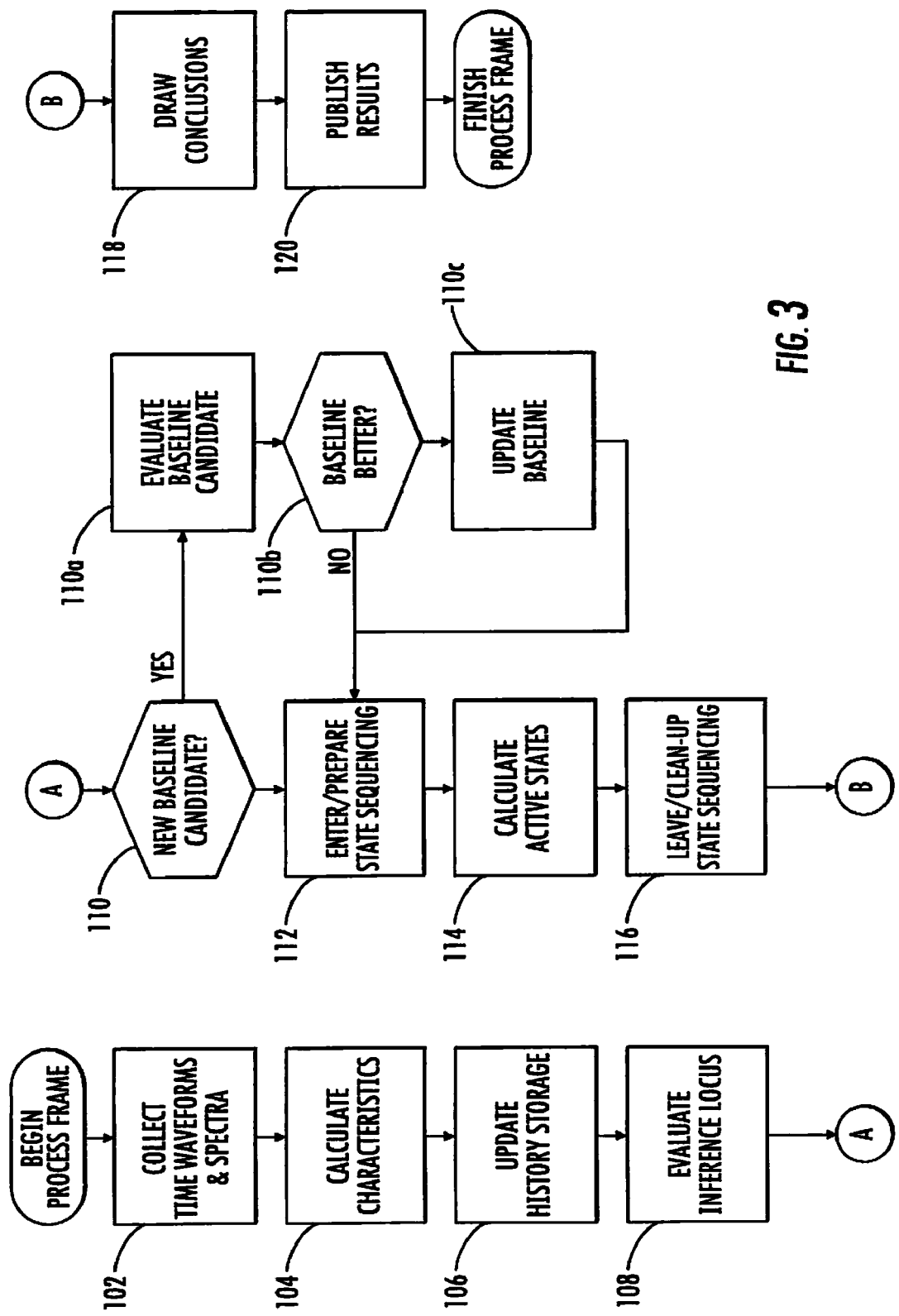
FIG. 3 depicts a flow diagram representing a process for monitoring the condition of a machine according to preferred embodiments of the invention.

From vibration and flux measurements taken at strategic locations on the machine 12, the calculated characteristics of A process for analyzing a machine's condition and generating machine condition information is depicted in FIG. 3. In the preferred embodiment of the invention, this machine condition analysis procedure is performed by the microprocessor 22 to provide a rapid screening of data associated with the overall condition of the machine 12 under test.

To illustrate the apparatus and method of this invention, the following representative example is provided. Upon initiation of the device 14, an initial baseline reference set of data is acquired (steps 102-110 of FIG. 3). Preferably, baseline or running average data is not acquired until at least about 30 seconds after machine start-up. Acquisitions preferably consist of a 0-40 kHz time waveform with an associated spectrum from each sensor 36a-36f, 38, and 40 (step 102). The appropriate operational characteristic parameters are then calculated and trended (steps 104 & 106). Examples of possible calculations in a preferred embodiment of this invention are listed in Table II. The equations provided are typical rather than exhaustive.

TABLE II

| Characteristic Parameter | Description |
|---|---|
| Time Waveform-based | |
| Peak-to-Peak | Also known as the signal span. Determined by locating $W_{max}$ and $W_{min}$ (the largest positive-going and the largest negative-going excursions in amplitude from the waveform mean) and calculating: $Pk2Pk = W_{max} - W_{min}$ |
| Root Mean Square (RMS) | Also known as the standard deviation. Determined as the square-root of the sum of the squared mean difference for each sample in the waveform. $$\overline{w} = \frac{1}{N}\sum_n W_n$$ $$RMS = \sqrt{\frac{1}{N}\sum_n (W_n - \overline{w})^2}$$ |
| Crest Factor | Determined as the ratio between the largest absolute excursion from the mean of the waveform and the RMS value. $$CF = \frac{\max(|W_{max} - \overline{w}|, |W_{min} - \overline{w}|)}{RMS}$$ |
| Frequency Spectrum-based | |
| Mid-band energy | Summation of the energy found between 1 kHz and 10 kHz in the Fourier transform of the waveform; square-root of the sum of power in the spectrum. $$E1k10k = \sqrt{\sum_{f=1k}^{10k} \mathcal{J}_f^2}$$ |
| High-band energy | Summation of the energy found between 10 kHz and 40 kHz in the Fourier transform of the waveform; square-root of the sum of power in the spectrum. $$E10k40k = \sum_{f=10k}^{40k} \mathcal{J}_f^2$$ |
| Low-band energy (as Velocity) | Summation of the energy, digitally integrated from acceleration to velocity, found below 1 kHz in the Fourier transform of the waveform. $$LowFreqVel = \sqrt{\sum_{f=\Delta}^{1k}\left(\frac{61.45\,\mathcal{J}_f}{f}\right)^2}$$ |

In addition, energy from a slot pass family parameter is calculated as needed. Preferably, the slot pass frequency parameters, such as those listed in Table III, are used only as a special test.

TABLE III

| | |
|---|---|
| Principle Slot Passing Frequency | $PSP_{RotorBar} = RotorBars \cdot Z_{Hz} + \mu \cdot L_{Hz}$ |
| | $Z_{Hz}$ = Fundamental Turning Frequency |
| (Rotor Bars) | $\mu = \begin{cases} 0, & \text{vibration} \\ 1, & \text{current \& flux} \end{cases}$ |
| | $L_{Hz}$ = Line Frequency |
| Principle Slot Passing Frequency | $PSP_{Stator} = StatorSlots \cdot Z_{Hz} + \mu \cdot L_{Hz}$ |
| | $Z_{Hz}$ = Fundamental Turning Frequency |
| (Stators) | $\mu = \begin{cases} 0, & \text{vibration} \\ 1, & \text{current \& flux} \end{cases}$ |
| | $L_{Hz}$ = Line Frequency |
| 2xLF Family of Slot Pass Frequencies | $2xLF = \sum_{n=0,2,4,6,8,10} PSP \pm n \cdot L_{Hz}$ |
| | $PSP = \{PSP_{RotoBar}, PSP_{Stator}\}$ |
| | $L_{Hz}$ = Line Frequency |

Based on a known number of rotor bars and stator slots of the machine 12, and the known speed of the machine 12, the device 14 calculates $PSP_{ROTORBAR}$ and $PSP_{STATOR}$ for each measurement on the machine 12. The device 14 then determines the 2xLF family of slot passing frequencies relating to both types of slot pass frequencies as described in Table II. If the machine 12 is operating within normal parameters, spectral peaks should be within ±0.25% of the expected frequency. In some embodiments, the energy of the largest PSP peak and two sidebands on either side of PSP is also calculated.

If neither the number of rotor bars nor stator slots is known, the system 10 calculates the 2×LF family of slot passing frequencies as follows: (1) locate the largest peak in the spectrum between 1 kHz and 10 kHz; (2) search for sidebands about the largest peak spaced at 2×LF (within ±0.25%); (3) locate two peaks on either side of the largest peak; and (4) determine the energy of this family.

One of the first analysis requirements in determination of machine condition is to use valid data. Accordingly, the device 14 uses several key boundary threshold values which act as data screening qualifiers, examples of which are listed in Table IV.

In the preferred embodiment of the invention, each characteristic parameter has a baseline population for evaluation which consists of the value as calculated from $<N=D_{[E]}>$ contiguous data acquisitions. At the end of N acquisitions, the population for each parameter is collapsed into a candidate pair$<A_{base}, \sigma_{base}>$ which represent the "normal" expectation for that parameter as indicated in FIG. 3 (step 110). This process preferably continues as long as the device 14 is running. After every N acquisitions, the population is preferably collapsed and a new candidate pair$<A_{new}, \sigma_{new}>$ is formed. If the new candidate value $A_{new}$ is valid and lower than the current baseline value $A_{base}$, the new value $A_{new}$ becomes the active baseline. Similarly, if the new value $\sigma_{new}$ is valid and

TABLE IV

| Value | Purpose |
|---|---|
| E | Defines the type of environment in which the machine-under-test operates as either $E_{smooth}$, $E_{rough}$ or $E_{normal}$. Based on the value E, the system modifies its expectations of the energy levels and variance expected for the analysis, and adjusts its sensitivity and fault conclusions accordingly. |
| D | Defines the size (depth) of a baseline population. Preferably, there is a different D value for each parameter for each operating environment. |
| O | Defines the "order" of a "lag filter" used to decide that a change in a parameter is significant. When the system detects a significant change, there must be O consecutive values before the change filters through to the analysis. There is preferably a different O value for each parameter for each operating environment. |
| N | A parametric scaling factor which helps define the width of the "steady" region around a baseline as well as the severity of any change. Preferably, there is a different N value for each parameter for each operating environment. |
| M | A parametric sigma scaling factor that helps define the width of the "steady" statistical region around a baseline. In the preferred embodiment, there is a different M value for each parameter in each operating environment. |
| $Min_{reading}$ | The smallest allowable RMS waveform value. If readings are below this value, the measurement is considered bad. There is preferably a different $Min_{reading}$ value for each parameter in each operating environment. |
| $Min_{diag}$ | The baseline value of a parameter which must be exceeded before diagnostic analysis will be performed. Levels below this point are considered too low to be significant. There is preferably a different $Min_{diag}$ value for each parameter in each operating environment. |
| $Min_{delta}$ | The analysis value that defines classification regions parametrically. This value places a limit on how small a change will be detected and passed through as significant. Preferably, there is a different $Min_{delta}$ value for each parameter in each operating environment. |
| $Min_{alarm}$ | Defines the point at which parametric alarms begin to affect the analysis results. In the preferred embodiment, there is a different $Min_{alarm}$ value for each parameter for each operating environment. |
| $Min_{always}$ | Defines a point beyond which any value is considered to trigger analysis; i.e., a meaningful "increase" in the value. However, the requirement of $O_E$ consecutive increasing values preferably still applies. There is preferably a different $Min_{always}$ value for each parameter for each operating environment. |

Table V indicates how the boundary threshold values will be applied to each characteristic parameter based on the classification of the machine operating environment as normal, smooth, or rough.

TABLE V

| | | | |
|---|---|---|---|
| E | $E_{normal}$ | $E_{smooth}$ | $E_{rough}$ |
| D | $D_{normal}$ | $D_{smooth}$ | $D_{rough}$ |
| O | $O_{normal}$ | $O_{smooth}$ | $O_{rough}$ |
| N | $N_{normal}$ | $N_{smooth}$ | $N_{rough}$ |
| M | $M_{normal}$ | $M_{smooth}$ | $M_{rough}$ |
| $Min_{reading}$ | $Min_{reading\ normal}$ | $Min_{reading\ smooth}$ | $Min_{reading\ rough}$ |
| $Min_{diag}$ | $Min_{diag\ normal}$ | $Min_{diag\ smooth}$ | $Min_{diag\ rough}$ |
| $Min_{delta}$ | $Min_{delta\ normal}$ | $Min_{delta\ smooth}$ | $Min_{delta\ rough}$ |
| $Min_{alarm}$ | $Min_{alarm\ normal}$ | $Min_{alarm\ smooth}$ | $Min_{alarm\ rough}$ |
| $Min_{always}$ | $Min_{always\ normal}$ | $Min_{always\ smooth}$ | $Min_{always\ rough}$ |

"tighter" than the current value $\sigma_{base}$, the new value $\sigma_{new}$ becomes the active baseline. This may be expressed as:

if $(A_{new} > Min_{diag})$ and $(A_{new} < A_{base})$ then $A_{base} = A_{new}$ if $(\sigma_{new} > Min_{diag})$ and $(\sigma_{new} < \sigma_{base})$ then $\sigma_{base} = \sigma_{new}$ Periodically the active baseline information for all parameters is saved to non-volatile storage so that in case of power failure recovery, the monitoring device 14 will be able to restart analysis more quickly.

Similarly, according to a preferred embodiment, a weighted running average is kept based on the formula:

$$A_i = 0.8 A_{i-1} + 0.2 x_i.$$

where $x_i$ is the calculated value of the particular parameter for the current iteration. At i=0, or whenever a new baseline is chosen, $A_i$ is set equal to $A_{base}$. This running average is preferably used to track baseline divergent trends and frame-to-frame step changes in parameters.

In the preferred embodiment, each instantaneous (current) parameter value is checked against a series of bounded regions for preliminary classification:

$$x_i \notin \left[ \frac{A_{base}}{N_{[E]}}, A_{base} \cdot N_{[E]} \right] \quad (1)$$

$$x_i \notin [A_{base} - M_{[E]}\sigma_{base}, A_{base} + M_{[E]}\sigma_{base}] \quad (2)$$

In the following discussion, the condition of a parameter value being classified as UP (increasing) or being classified as DOWN (decreasing) is defined as follows:

[parameter value satisfies equations (1) and/or (2) above
AND
parameter value>$Min_{alarm[E]}$
AND
parameter value discrepancy magnitude>$Min_{delta[E]}$] OR parameter value>$Min_{always[E]}$.

The condition of a parameter being classified as STEADY is equivalent to NOT (UP or DOWN).

Figure 4:
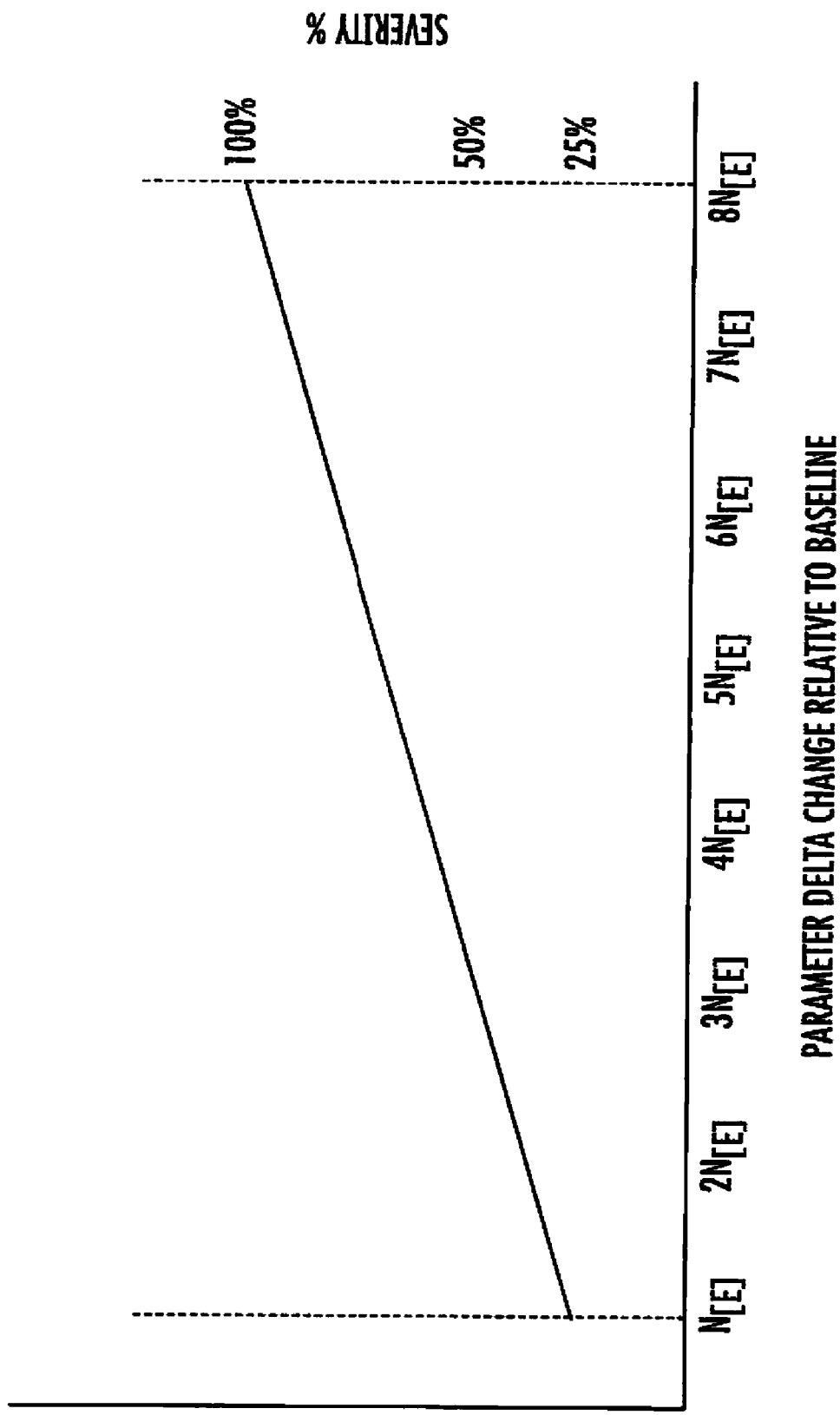
FIG. 4 depicts a graph of early detector severity versus increase of average parameter value according to preferred embodiments of the invention.

Early detector severity versus increase in average characteristic parameter value is depicted in the graph of FIG. 4. The range of severity from 25% to 100% is scaled by the parametric values from Table IV associated with the currently selected operating environment as defined in Table V.

In the following discussion there are numerous statements of the form:

if <P> is <C> then <R> is <V> where <P> is a measured or calculated characteristic parameter as described in Table II or III;

where <C> is a particular possible fault classification according to the model; where <R> is an accumulating result variable or partial conclusion to be reached based on the similarity of <P> with <C>; and where <V> is a transfer function to be applied to <R> such that the strength of the conclusion is modeled on the similarity of <P> with <C>.

Multiple implication clauses, such as <P> is <C>, may occur in a single similarity statement. Multiple consequence clauses, such as <R> is <V>, may occur in a single similarity statement. Multiple results <R> may be affected by a single transfer function <V>. In higher level meshes, the input <P> may be the output <R> of a previous similarity statement. In that case, the result is the similarity of the partial conclusion with the classifier concept <C>.

Each similarity statement is an edge in a multiply-connected directed graph forming a mesh. The edge may be viewed as a zener diode which prevents conduction up to a threshold and then begins conducting. The implication clause of the statement represents the biasing threshold and the consequence clause represents the passed voltage.

Each node in the graph represents a set of possible partial conclusions which can be reached based on the similarity of one or more incoming edges to their implication clauses. A conclusion node will "fire" to the extent that one or more consequence clauses "conduct" and the strength of the edge's output defines its "belief" in the conclusion(s) represented by the node. The "bulge" of a particular node in the implication mesh is a combination of any incoming edges to the extent they have exceeded their "bias voltage" and the back-pressure from any outgoing edges which are not yet "conducting" to the extent that they are under their "bias voltage".

The resultant for each component implication mesh is derived using a "preponderance of evidence" evaluation of all the intermediate conclusions so accumulated to determine the "potential field" around each possible fault classification. The most likely condition, if any, is enunciated in a fault-classification alert for the component. The condition indication values of the individual components are derived by calculating the magnitude of a severity-weighted degradation vector and subtracting the result from 1.0 to produce an approximation to the component condition.

The overall condition conclusion for the machine as a whole is derived from the individual component contributions as a cascade in a similar fashion. Additional parameters which are not component specific, and partial conclusions at the component level which can not be adequately differentiated, are also taken into consideration such that the overall condition indication value reported by the device 14 varies fairly independently from the condition indication values of the components. Additional fault-classification alerts may be produced and enunciated at the overall level in addition to any produced by the individual components.

The entire inference mechanism may be extended or replaced by downloading new characteristic parameter calculation descriptions, new parameter-controlling threshold values, new fault classification descriptions, new partial conclusion nodes, new activating edges, and/or entirely new implication mesh definitions from a computer 15.

The following diagnostic path is an instructive example showing how the device 14 uses multiple data sources and multiple parameters at each source to derive overall conclusions regarding machine conditions. The particular example provided is specific to an AC induction motor coupled directly to a centrifugal pump. It will be apparent to those skilled in the art that the techniques disclosed herein may also be applied to many other machinery configurations without departing from the teachings herein.

Initial conclusion confidence percentage (weighting) values for the similarity transfer function <V> (as represented below by X) are multiple different values that are utilized. These values X are empirically derived through historical experience and are inherent in the model. They may be varied according to the application and installation. The invention also encompasses mechanisms for learning new values X from a combination of user configuration parameters and historical data acquired as a natural consequence of the operation of the device 14 as described in FIG. 3, and particularly step 106. Preliminary Validation (All Sensors)

1. if RMS is TOOSMALL
   then SENSORGONE is Confidence X %
2. if RMS is DOWNSIGNIFICANTLY
   then SENSORGONE is Confidence X %

Preliminary Per Sensor Diagnostics (All Components)

1. if E1k10k is UP and E10k40k is STEADY
   then BRGFAILDEGRADE is Confidence X %
2. if E1k10k is STEADY and E10k40k is UP
   then BRGLUBEFATIGUE is Confidence X %
3. if LowFreqVel is UP
   then {MISALIGNMENT, IMBALANCE, LOOSENESS} is Confidence X %

Pump-Specific Diagnostics, Per-Sensor 1. if E1k10k is STEADY and E10k40k is UP
   then CAVITATION is Confidence X %
2. if E1k10k is UP and E10k40k is UP
   then CAVITATION is Confidence X %
3. if CrestFactor is UP and E1k10k is UP and E10k40k is STEADY
   then BRGFAILDEGRADE is Increased X %
4. if CrestFactor is UP and E1k10k is STEADY and E10k40k is UP
   then {CAVITATION, BRGLUBEFATIGUE} is Increased X %

5. if Pk2Pk is Up and CurrentFaults is Empty
   then GenVibration is Confidence X %
Pump Overall Diagnostics
1. if InboardBearing (E1k10k) is Up and OutboardBearing (E1k10k) is Up
   then Cavitation is Increased X %
2. if InboardBearing (E10k40k) is Up and OutboardBearing (E10k40k) is Up
   then Cavitation is Increased X %
3. if InboardBearing (E10k40k) is Up and OutboardBearing (E10k40k) is Steady
   then BrgLubeFatigue is Increased X %
4. if InboardBearing (E10k40k) is Steady and OutboardBearing (E10k40k) is Up
   then BrgLubeFatigue is Increased X %
where InboardBearing (parameter) is the value of the specified characteristic parameter as calculated from signal data collected at a sensor placed near the inboard bearing on the pump being monitored by the device 14. OutboardBearing (parameter) is the value of the characteristic parameter as calculated from signal data collected at a sensor placed near the outboard bearing on the pump being monitored.
5. if Cavitation is Indicated but Specific Gravity of Pumped Fluid >Z
   then Cavitation is Decreased X %
where Z is a configuration value inherent to the model. The value Z may be varied according to the installation based on an application handling various materials.
Motor-Specific Diagnostics, Per-Sensor
1. if E1k10k is Up and E10k40k is Steady
   then EccSoftFtRtrBar is Confidence X %
2. if E1k10k is Up and E10k40k is Up
   then {BrgLubeFatigue, BrgFailDegrade, EccSoftFtRtrBar} is Confidence X %
3. if CrestFactor is Up and E1k10k is Up and E10k40k is Steady
   then BrgFailDegrade is Increased X %
4. if CrestFactor is Up and E1k10k is Steady and E10k40k is Up
   then BrgLubeFatigue is Increased X %
5. if Pk2Pk is Up and CurrentFaults is Empty
   then GenVibration is Confidence X %
Motor Overall Diagnostics
1. if InboardBearing (E10k40k) is Up and OutboardBearing (E10k40k) is Steady
   then BrgLubeFatigue is Increased X %
2. if InboardBearing (E10k40k) is Steady and OutboardBearing (E10k40k) is Up
   then BrgLubeFatigue is Increased X %
where InboardBearing (parameter) is the value of the specified characteristic parameter as calculated from signal data collected at a sensor placed near the inboard bearing on the motor being monitored by the device 14, and OutboardBearing (parameter) is the value of the characteristic parameter as calculated from signal data collected at a sensor placed near the outboard bearing on the motor being monitored.
Eccentricity
For situations where eccentricity is suspected, the device 14 calculates the energy of the 2×LF family of slot pass frequencies (2×LF_SPF) as described in Table III and subtracts this energy from the 1 kHz-10 kHz spectral energy parameter (E1k10k). If the resulting parameter value still qualifies as being Up (i.e., an increase is observed), then eccentricity is ruled out. If the resulting parameter value now qualifies as Steady (i.e., no increase is observed), then the problem is probably related to eccentricity. This determination may be expressed as follows:

1. if E1k10k is Up and (E10k40k is Steady or E10k40k is Up) and (E1k10k−2×LF_SPF) is Up
   then EccSftFtRtrBar is Excluded
2. if E1k10k is Up and (E10k40k is Steady or E10k40k is Up) and (E1k10k−2×LF_SPF) is Steady
   then BrgFailDegrade is Decreased X %
Machinery Overall Diagnostics Refinements
1. if PumpInboard (E1k10k is Steady and E10k40k is Up) and MotorInboard (E1k10k is Steady and E10k40k is Up)
   then Cavitation is Excluded, GenVibration is Confidence X %
2. if PumpInboard (E1k10k is Up and E10k40k is Up) and MotorInboard (E1k10k is Up and E10k40k is Steady)
   then Cavitation is Unlikely, GenVibration is Confidence X %
where MotorInboard (parameter) is the value of the specified characteristic parameter as calculated from signal data collected at a sensor placed near the inboard bearing on the motor of the machine being monitored by the device 14, and PumpInboard (parameter) is the value of the specified characteristic parameter as calculated from signal data collected at a sensor placed near the inboard bearing on the pump of the machine being monitored.

The core operation of the device 14, and in particular the processing associated with the inference mechanism described herein, is depicted in FIG. 3. Once operational, the analytical portion of device 14 proceeds iteratively according to a frame-based pattern. Prior to the begin step, any configuration parameters which may have been changed by the computer 15 are copied for reference during the frame. This isolates the frame from possible disruption and ensures the computational integrity of each frame. Any pending data transmission requests are processed after the finish step. This ensures that data transmitted as a group comes from a single iteration of the process frame and is internally consistent.

Steps 102, 104, and 106 of the preferred embodiment of the invention are preparatory in nature and are preferably performed prior to the processing associated with the inference mechanism. Step 106 provides the contribution of each measured or calculated characteristic parameter to a historical record of that particular parameter over time. This is done in a hierarchical cascade of statistical groupings where each chained population is built on the preceding one. Whenever a particular sample population fills up, the set of sample values is collapsed into a statistical representation which constitutes a single representative sample for the next higher set. The contents of the lower set is then reset and begins accumulating a new set of samples. This forward propagation of statistical characterizations continues until a final predefined superset has been reached. An example would be a lowest level set which holds sixty (60) samples and represents one hour's worth of collection at a one minute granularity. The next higher level set holds twenty-four (24) samples and represents one day's worth of collection; i.e., twenty-four "overflow cycles" of the lower set.

Step 108 involves determining which inference mesh components should contribute in the current frame cycle based on sensor status, machine on/off state, etc.

Step 112 provides a notification to all eligible components that are going to participate in the current iteration. This allows them to "bind" current configuration parameters, threshold values, etc. which are necessary to dynamically calculate the similarity statements.

Step 114 is a cascaded calculation of all eligible inference elements starting from the lowest (independent variables) and proceeding upwards through the similarity statements contained in activating edges, through the partial conclusion nodes, and finally into the condensing process for the overall mesh as described previously.

Step 116 provides a notification to all affected components that their participation has completed. This provides an opportunity to "clean up" and release any temporary resources as appropriate.

In step 118, the component-level condition values and the overall machine condition value are calculated.

Step 120 provides a point where all data produced in the frame is consistent, and any automatic export of fault-classification alerts, condition values, or intermediate results may safely occur without danger of inadvertent corruption by competing threads of execution.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally, and equitably entitled.

What is claimed is:

1. A method for determining a probable operational condition of a machine, comprising:
   (a) acquiring data based upon sensor signals generated by a plurality of sensors attached to the machine, where the sensor signals are indicative of operational characteristics of the machine;
   (b) processing the data to calculate a plurality of operational characteristic parameters indicative of the probable operational condition of the machine;
   (c) operating on the operational characteristic parameters to derive a single probable condition value expressed on a continuous numerical scale, the probable condition value indicative of the probable operational condition of the machine;
   (d) detecting that the probable condition value has fallen below a predetermined threshold;
   (e) upon detecting that the probable condition value has fallen below the predetermined threshold, generating a fault-classification alert which identifies a most likely cause of degradation in the operational condition of the machine based on analysis of the operational characteristic parameters; and
   (f) communicating the probable condition value and the fault-classification alert via a communication network to a central monitoring system,
   wherein at least steps (a), (b), (c), (d), and (e) are performed by a machine condition reporting device coupled to the machine.

2. The method of claim 1 wherein step (c) further comprises operating on the operational characteristic parameters to derive the probable condition value expressed on a continuous numerical scale between 0.0 and 1.0, where 0.0 indicates a failed condition and 1.0 indicates a proper operational condition of the machine.

3. The method of claim 1 further comprising:
   (g) comparing multiple condition values communicated to the central monitoring system over an extended period of time to evaluate changes in the probable operational condition of the machine over the period.

4. The method of claim 3 wherein step (g) further comprises performing a comparison selected from the group consisting of:
   comparing the multiple probable condition values to determine a rate of change of the values over the period;
   comparing one or more of the multiple probable condition values communicated before a change in a production parameter to one or more of the multiple probable condition values communicated after the change in the production parameter;
   comparing one or more of the multiple probable condition values communicated while a first operator is operating the machine to one or more of the multiple probable condition values communicated while a second operator is operating the machine; and
   comparing one or more of the multiple probable condition values to an alarm threshold.

5. The method of claim 1 further comprising
   adjusting production parameters based on the probable condition of the machine indicated by the probable condition value.

6. The method of claim 1 further comprising:
   (g) operating on the operational characteristic parameters to derive a baseline signature vector which is indicative of a baseline state of operation of the machine; and
   (h) periodically repeating step (g) to adjust the baseline signature vector to reflect changes in the baseline state of operation of the machine over time.

7. The method of claim 1 wherein step (b) comprises processing the data to generate frequency spectral data, and processing the frequency spectral data to generate a plurality of frequency-based characteristic parameters using order-based techniques which are dependent on a rotational speed of a component of the machine.

8. A machine condition indication device configured for attachment to a machine for reporting information regarding a probable operational condition of the machine to a central monitoring system, the device comprising:
   a plurality of sensors mounted at a plurality of locations on the machine for sensing operational characteristics at the plurality of locations and for producing a plurality of sensor signals indicative of the operational characteristics;
   a processor coupled to the plurality of sensors for acquiring sensor data from the plurality of sensor signals related to the operational characteristics, processing the sensor data to calculate a plurality of operational characteristic parameters indicative of the probable operational condition of the machine, and operating on the operational characteristic parameters to derive a single probable condition value expressed on a continuous numerical scale, the probable condition value indicative of the probable operational condition of the machine,
   the processor further operable to detect that the probable condition value has fallen below a predetermined threshold, and upon detecting that the probable condition value has fallen below the predetermined threshold the processor generating a fault-classification alert which identifies a most likely cause of degradation in the operational condition of the machine based on analysis of the operational characteristic parameters; and
   a communication interface for communicating the probable condition value and the fault-classification alert via a communication network to the central monitoring system.

9. The machine condition indication device of claim 8 wherein the processor operates on the operational characteristic parameters to derive the probable condition value expressed on a continuous numerical scale between 0.0 and 1.0, where 0.0 indicates a failed condition and 1.0 indicates a proper operational condition of the machine.

10. The machine condition indication device of claim 8 wherein the processor operates on the operational characteristic parameters to derive a baseline signature vector which is indicative of a baseline state of operation of the machine, and periodically adjusts the baseline signature vector to reflect changes in the baseline state of operation of the machine over time.

11. The machine condition indication device of claim 8 wherein:
- at least one of the plurality of sensors comprises a rotational speed sensor for sensing a rotational speed of a component of the machine and generating a rotational speed signal; and
- the processor for acquiring rotational speed data from the rotational speed signal, processing the sensor data to calculate frequency spectral data, and processing the frequency spectral data and the rotational speed data to calculate a plurality of frequency-based characteristic parameters using order-based techniques which are dependent on the rotational speed of the component of the machine.

12. A machine condition indication device configured for attachment to a machine for reporting information regarding a probable operational condition of the machine to a central monitoring system, the device comprising:
- means for acquiring data based upon sensor signals generated by a plurality of sensors attached to the machine, where the sensor signals are indicative of operational characteristics of the machine;
- means for processing the data to calculate a plurality of operational characteristic parameters which are used to compute the probable operational condition of the machine;
- means for operating on the operational characteristic parameters to derive a single probable condition value expressed on a continuous numerical scale, the probable condition value indicative of the probable operational condition of the machine;
- means for detecting that the probable condition value has fallen below a predetermined threshold indicating degradation in the operational condition of the machine;
- means for generating a fault-classification alert which identifies a most likely cause of the degradation in the operational condition of the machine based on analysis of the operational characteristic parameters; and
- means for communicating the probable condition value and the fault-classification alert to the central monitoring system.

13. A method for determining a probable operational condition of a machine, comprising:
- (a) acquiring data based upon sensor signals generated by a plurality of sensors attached to the machine, where the sensor signals are indicative of operational characteristics of the machine;
- (b) processing the data to calculate a plurality of operational characteristic parameters indicative of the probable operational condition of the machine;
- (c) operating on the operational characteristic parameters to derive a single probable condition value expressed on a continuous numerical scale, the probable condition value indicative of the probable operational condition of the machine;
- (d) operating on the operational characteristic parameters to derive a baseline signature vector which is indicative of a baseline state of operation of the machine; and
- (e) periodically repeating step (d) to adjust the baseline signature vector to reflect changes in the baseline state of operation of the machine over time, wherein at least steps (a), (b), and (c) are performed by a machine condition reporting device coupled to the machine.

14. A method for determining a probable operational condition of a machine, comprising:
- (a) acquiring data based upon sensor signals generated by a plurality of sensors attached to the machine, where the sensor signals are indicative of operational characteristics of the machine;
- (b) processing the data to calculate a plurality of operational characteristic parameters indicative of the probable operational condition of the machine;
- (c) operating on the operational characteristic parameters to derive a single condition value expressed on a continuous numerical scale, the probable condition value indicative of the probable operational condition of the machine; and
- (d) operating on the operational characteristic parameters to derive a baseline signature vector which is indicative of a baseline state of operation of the machine by:
  - (d1) acquiring N number of initial data acquisitions from the plurality of sensor signals;
  - (d2) processing the data from the N number of initial data acquisitions to calculate N number of baseline values for each of the operational characteristic parameters;
  - (d3) calculating a representative baseline pair for each of the operational characteristic parameters based on the N number of baseline values, where each baseline pair $<A_{base}, \sigma_{base}>$ comprises a baseline value, $A_{base}$, and a baseline sigma, $\sigma_{base}$;
  - (d4) acquiring N number of new data acquisitions from the plurality of sensor signals subsequent to taking the initial data acquisitions;
  - (d5) processing the data from the N number of new data acquisitions to calculate N number of new values for each of the operational characteristic parameters;
  - (d6) calculating a new pair for each of the operational characteristic parameters based upon the N number of new values, where each new pair $<A_{new}, \sigma_{new}>$ comprises a new value, $A_{new}$, and a new sigma, $\sigma_{new}$; and
  - (d7) operating on the baseline pairs and new pairs according to:

if $(A_{new} > Min_{diag})$ and $(A_{new} < A_{base})$ then $A_{base} = A_{new}$ and if $(\sigma_{new} > Min_{diag})$ and $(\sigma_{new} < \sigma_{base})$ then $\sigma_{base} = \sigma_{new}$.

where $Min_{diag}$ is a minimum amplitude value of the operational characteristic parameter which varies according to the operating environment of the machine, and wherein at least steps (a), (b), and (c) are performed by a machine condition reporting device coupled to the machine.

15. A method for determining a probable operational condition of a machine, comprising:
   (a) acquiring data based upon sensor signals generated by a plurality of sensors attached to the machine, where the sensor signals are indicative of operational characteristics of the machine;
   (b) processing the data to calculate a plurality of operational characteristic parameters indicative of the probable operational condition of the machine;
   (c) operating on the operational characteristic parameters to derive a single condition value expressed on a continuous numerical scale, the probable condition value indicative of the probable operational condition of the machine;
   (d) operating on one or more of the operational characteristic parameters to determine a relationship of each operational characteristic parameter to a corresponding baseline value for the operational characteristic parameter; and
   (e) classifying the one or more operational characteristic parameters as increasing, decreasing or steady based at least on part on the relationship of each operational characteristic parameter to the corresponding baseline value for the operational characteristic parameter,
   wherein at least steps (a), (b), and (c) are performed by a machine condition reporting device coupled to the machine.

16. A method for determining a probable operational condition of a machine, comprising:
   (a) acquiring data based upon sensor signals generated by a plurality of sensors attached to the machine, where the sensor signals are indicative of operational characteristics of the machine;
   (b) processing the data to calculate instantaneous values, $x_i$, for each of a plurality of operational characteristic parameters which are indicative of the probable operational condition of the machine; and
   (c) operating on one or more of the operational characteristic parameters to determine a relationship of each operational characteristic parameter to a corresponding baseline value for the operational characteristic parameter by determining whether each instantaneous value, $x_i$ of the operational characteristic parameter for the data acquisition satisfies either or both of the following conditions:

$$x_i \notin \left[\frac{A_{base}}{N_{[E]}}, A_{base} \cdot N_{[E]}\right]$$

$$x_i \notin [A_{base} - M_{[E]}\sigma_{base}, A_{base} + M_{[E]}\sigma_{base}]$$

where $A_{base}$ is the baseline value of the operational characteristic parameter, $\sigma_{base}$ is a statistical sigma of the baseline value, $N_{[E]}$ is a parametric amplitude scaling factor and $M_{[E]}$ is a parametric sigma scaling factor which together define a stable statistical range around the baseline value, and where the values of $N_{[E]}$ and $M_{[E]}$ depend on the operating environment of the machine.

17. The method of claim 16 further comprising:
   (d1) classifying each operational characteristic parameter as increasing or decreasing if
      the instantaneous value, $x_i$, of the operational characteristic parameter satisfies either or both of the conditions of step (c) AND
      the instantaneous value is greater than a value $Min_{alarm[E]}$ AND
      a discrepancy magnitude of the instantaneous value is greater than a value $Min_{delta[E]}$ OR
      the instantaneous value is greater than a value $Min_{always[E]}$; or
   (d2) classifying the operational characteristic parameter as steady if it is not classified as increasing or decreasing, where $Min_{alarm[E]}$ defines a threshold at which parametric alarms begin to affect analysis results, $Min_{delta[E]}$ defines a threshold at which a change in the operational characteristic parameter will be designated as significant, and $Min_{always[E]}$ defines a threshold beyond which the operational characteristic parameter is considered to have increased by a meaningful amount.

18. A machine condition indication device configured for attachment to a machine for reporting information regarding a probable operational condition of the machine to a central monitoring system, the device comprising:
   a plurality of sensors mounted at a plurality of locations on the machine for sensing operational characteristics at the plurality of locations and for producing a plurality of sensor signals indicative of the operational characteristics;
   a processor coupled to the plurality of sensors for acquiring sensor data from the plurality of sensor signals related to the operational characteristics, processing the sensor data to calculate a plurality of operational characteristic parameters indicative of the probable operational condition of the machine, and operating on the operational characteristic parameters to derive a single probable condition value expressed on a continuous numerical scale, the probable condition value indicative of the probable operational condition of the machine, wherein the processor operates on the operational characteristic parameters to derive a baseline signature vector which is indicative of a baseline state of operation of the machine, and periodically adjusts the baseline signature vector to reflect changes in the baseline state of operation of the machine over time; and
   a communication interface for communicating the probable condition value via a communication network to the central monitoring system.

19. A machine condition indication device configured for attachment to a machine for reporting information regarding a probable operational condition of the machine to a central monitoring system, the device comprising:
   a plurality of sensors mounted at a plurality of locations on the machine for sensing operational characteristics at the plurality of locations and for producing a plurality of sensor signals indicative of the operational characteristics;
   a processor coupled to the plurality of sensors for acquiring sensor data from the plurality of sensor signals related to the operational characteristics, processing the sensor data to calculate a plurality of operational characteristic parameters indicative of the probable operational condition of the machine, and operating on the operational characteristic parameters to derive a single probable condition value expressed on a continuous numerical scale, the probable condition value indicative of the probable operational condition of the machine, wherein the processor operates on one or more of the operational characteristic parameters to determine a relationship of each operational characteristic parameter to a corresponding baseline value for the operational characteristic parameter, and classifies the one or more operational characteristic parameters as increasing, decreasing or steady based at least on part on the relationship of each operational characteristic parameter to the corresponding baseline value for the operational characteristic parameter; and a communication interface for communicating the probable condition value via a communication network to the central monitoring system.

* * * * *